May 24, 1932. M. RATHBUN 1,859,794
MEANS FOR CONNECTING KNOBS TO SHAFTS
Filed Aug. 23, 1927
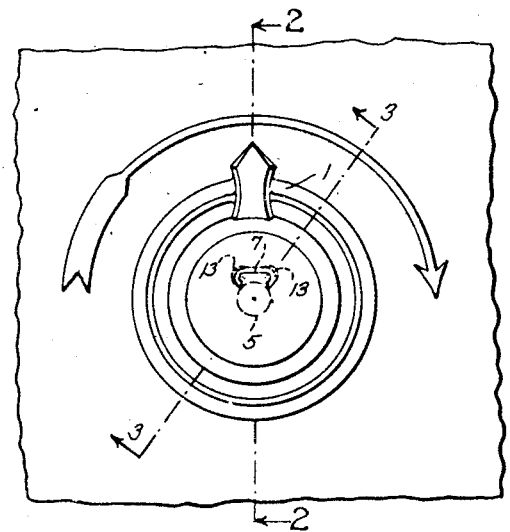
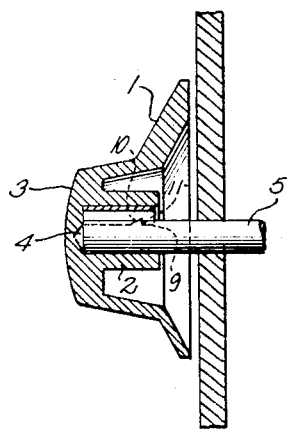
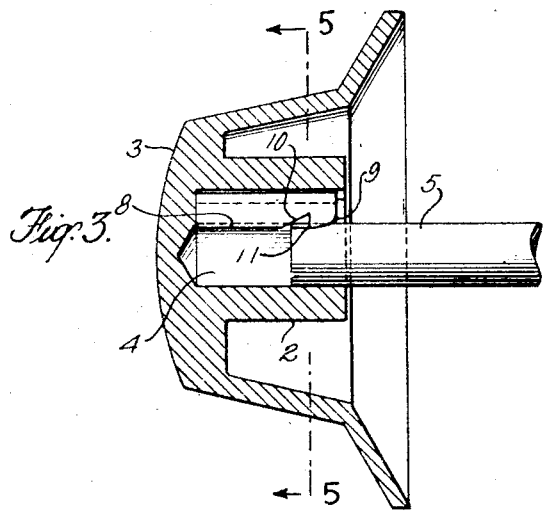
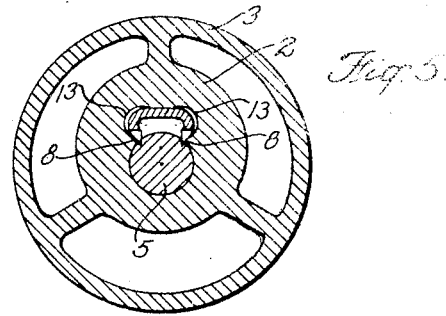
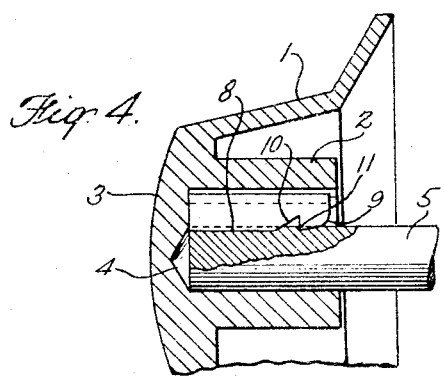
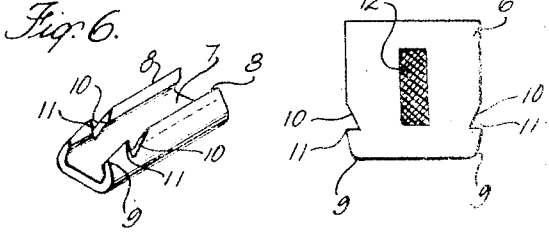
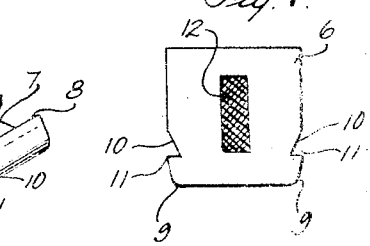
INVENTOR
Merrill Rathbun
BY
Newell & Spencer
ATTORNEYS Patented May 24, 1932

1,859,794

UNITED STATES PATENT OFFICE

MERRILL RATHBUN, OF LOCKPORT, NEW YORK, ASSIGNOR TO NORTON LABORATORIES, INC., OF LOCKPORT, NEW YORK, A CORPORATION OF MAINE

MEANS FOR CONNECTING KNOBS TO SHAFTS

Application filed August 23, 1927. Serial No. 214,836.

This invention relates to knobs or dials such as are used upon broadcast receiving sets to adjust manually the tuninig units, and has particular reference to the manner of attaching such a knob to its associated shaft.

It has been the practice heretofore to form the hub of the knob with a central bore of sufficient diameter readily to slide longitudinally over the end of the shaft to which the knob is to be attached and then to secure the knob from axial as well as rotative movement upon the shaft by means of a set screw. This manner of securing the shaft has proved very unsatisfactory because of the tendency of the set screws to work loose, the threads becoming stripped or worn from frequent adjustment of the screw. Moreover, frequently breaking of the knob results from forcing the screw too tightly into the shaft, and loss of the set screws during shipment or installation is not an uncommon occurrence.

It is the purpose of this invention to overcome these and other difficulties by providing a knob having means constituting an integral part thereof which will automatically secure the knob rigidly to the shaft when it is placed thereon.

In order to accomplish this I provide a locking device within the hub of the knob which will permit the knob to be forced upon the shaft but will thereafter grip the shaft and retain the knob thereon in such a manner that the knob will be secured against axial as well as rotative movement upon the shaft. The locking device may consist of a metallic member having a knife edge or a plurality of such edges separately spaced around the bore or connected together by a bridging member, the knife edge or edges projecting into the bore of the knob and being adapted to bite into the shaft as the knob is pressed upon the shaft.

A more detailed description will now be given in connection with the drawings in which Fig. 1 is a front elevation of a knob constructed in accordance with this invention;

Fig. 2 is a section on line 2—2 of Fig. 1;

Fig. 3 is a section on line 3—3 of Fig. 1;

Fig. 4 is a similar section showing the knob fully engaged and illustrating a slightly modified form of securing device;

Fig. 5 is a section on line 5—5 of Fig. 3;

Fig. 6 is a perspective of one form of locking device employed; and

Fig. 7 is a detail of the blank from which the locking device may be made.

In the embodiment shown in Figs. 1, 2, 3 and 5 by way of illustration I have shown my invention as applied to the usual knob or dial 1 having a body or hub portion 2 and a handle portion 3 formed of any suitable material such as bakelite, the hub portion being bored longitudinally as at 4 to receive the end of a metal shaft 5. The bore is of sufficient diameter to permit the shaft to be inserted thereinto without any excess freeness. The hub is also recessed adjacent to the bore to receive the securing device or member which may conveniently be formed from a flat metallic member 6 and formed into a substantially U-shaped element 7 of approximately the same length as the axial length of the bore in the hub, that is, of substantially the same length as the portion of the shaft which extends into the knob. The free ends of the U-shaped member are of sufficient length to project into the bore when the element is in the recess formed in the hub and may be sharpened to knife edges 8 more readily to grip the shaft.

In order to facilitate insertion of the shaft in the knob, the outer end of each knife edge is rounded as shown at 9 and preferably a leading-in portion of the knife edge is provided which, for a distance back from its end, is relieved somewhat as shown so that the shaft may be inserted a little ways into the bore before the knife edge begins to make a substantial cut in the shaft. To facilitate the starting of the actual cutting, the knife edge is notched as shown at 10 in such manner that a sharp corner 11 is provided, which tends to prevent the removal of the shaft from the knob, and that beyond this the bottom of the notch slopes upwardly to the cutting edge of the knife edge to facilitate the further cutting action of the knife edge.

The back of the U-shaped member may be knurled as at 12 upon the portion connecting the free ends in order to retain the member in its recess in the knob after being pressed therein.

In order to compensate for any slight variation in the diameters of the so-called standard sizes of shafts and eliminate any possibility of cracking the knob due to too great stresses such as would occur if a knob were being forced upon an oversized shaft, the recess into which the securing element fits may be enlarged at the corners as at 13 to permit the free arms of the element to recede thereinto whenever the forces are sufficient to flex the securing element. In such instances, the enlarged corners must not be of sufficient depth to allow the free arms to recede to an extent that their knife edges will not engage the shaft.

In the embodiment shown in Fig. 4, I have shown a slightly different form in which the securing element may be molded into the hub and in which the outer ends of the knife edges beyond the notches are cut away to form longer guiding or pilot edges to permit of more ready placement of the knob upon the shaft.

From the foregoing description, it will be apparent that I have provided a means integral with a knob or dial which will automatically grip the shaft and rigidly secure the knob thereto upon the mere placement of the knob thereupon.

Although I have shown in the accompanying drawings and have described above a knurled knob such as is used in radio sets, it will be understood that my invention is applicable wherever an operating member is to be mounted by sliding over the end of a shaft and is to transmit or receive a relatively small torque. I do not therefore intend to be limited by any strict interpretation of the word "knob" as used in the accompanying claims.

It is obvious that either form of securing element may be pressed or molded into the hub and that various other changes may be made in the detail structure without departing from the spirit and scope of the invention as defined in the appended claims.

I claim:

1. A knob for attachment to a shaft comprising a body portion having a bore therein to receive the end of a shaft and means for securing said knob to said shaft comprising a member terminating in a plurality of knife edges resiliently mounted in said knob and projecting into said bore adapted automatically to grip said shaft when said knob is placed thereon.

2. A knob for attachment to a shaft comprising a body portion having a bore therein to receive the end of a shaft and means for securing said knob to said shaft comprising a substantially U-shaped resilient member mounted in said knob, the free ends of which project into said bore so as to engage a shaft therein and are adapted automatically to grip said shaft when said knob is placed thereon, said bore being shaped to accommodate resilient deformation of the U-shaped member which results from the introduction of the shaft into the bore.

3. A knob for attachment to a shaft comprising a body portion having a bore therein to receive the end of a shaft and means for securing said knob to said shaft comprising a substantially U-shaped resilient member mounted in said knob, the free ends of which are sharpened to form knife edges and project into said bore so as to engage a shaft therein, said U-shaped member being adapted to force said knife edges into engagement with a shaft in said bore and to exert a continuing pressure thereon, and said bore being adapted to accommodate resilient deformation of said U-shaped member required to permit the shaft to enter said bore.

4. A knob for attachment to a shaft comprising a body portion having a bore therein to receive the end of a shaft and means for securing said knob to said shaft comprising a substantially U-shaped resilient member mounted in said knob, the free ends of which are sharpened to form knife edges and project into said bore so as to engage a shaft therein, said edges being notched to form barbs which tend to prevent axial separation of the knob from a shaft once engaged by said barbs.

5. A knob for attachment to a shaft comprising a body portion having a bore therein to receive the end of a shaft and means for securing said knob to said shaft comprising a substantially U-shaped resilient member mounted in said knob, the free ends of which are sharpened to form knife edges and project into said bore so as to engage a shaft therein, said edges being sloped toward the outer end of the bore so as to permit said knob readily to be placed on said shaft and to effect a resilient deformation of the U-shaped member which will cause the knife edges to be continually pressed against said shaft.

6. A knob for attachment to a shaft comprising a body portion having a bore therein to receive the end of a shaft and having a recess adjacent said bore and means mounted within said recess for securing said knob to said shaft comprising a substantially U-shaped member, the free ends of which project into said bore adapted automatically to grip said shaft when said knob is placed thereon, said free ends being free to recede into said recess to compensate for variations in size of said shaft.

Signed at Lockport, New York, this 17th day of August, 1927.

MERRILL RATHBUN.